United States Patent [19]

Melfi

[11] Patent Number: 4,558,850
[45] Date of Patent: Dec. 17, 1985

[54] NOISE BARRIER

[75] Inventor: Nicholas W. Melfi, Manlius, N.Y.

[73] Assignee: Concrete Pipe & Products Corp., E. Syracuse, N.Y.

[21] Appl. No.: 650,102

[22] Filed: Sep. 13, 1984

[51] Int. Cl.⁴ .............................................. E04H 17/14
[52] U.S. Cl. ....................................... 256/24; 256/19; 256/27; 256/26; 52/285; 403/87; 403/382; 181/210
[58] Field of Search ....................... 256/24, 73, 19, 26, 256/27, 1; 52/285; 403/87, 382, 403, 116, 117; 181/284, 210; 404/6; 16/362, 363

[56] References Cited
U.S. PATENT DOCUMENTS

| 3,732,653 | 9/1973 | Pickett | 256/19 X |
| 3,992,054 | 11/1976 | Campagnolo | 403/87 X |
| 4,111,401 | 9/1978 | Pickett | 256/26 X |
| 4,402,384 | 9/1983 | Smith et al. | 181/284 X |

Primary Examiner—Cornelius J. Husar
Assistant Examiner—Joseph A. Fischetti
Attorney, Agent, or Firm—Bruns and Wall

[57] ABSTRACT

A concrete serpentine noise barrier formed by a series of vertically disposed concrete panels that are placed in end to end abutment. Each adjacent pair of panels is provided with a socket-like joint that allows the panels to be angularly adjusted in assembly.

8 Claims, 6 Drawing Figures

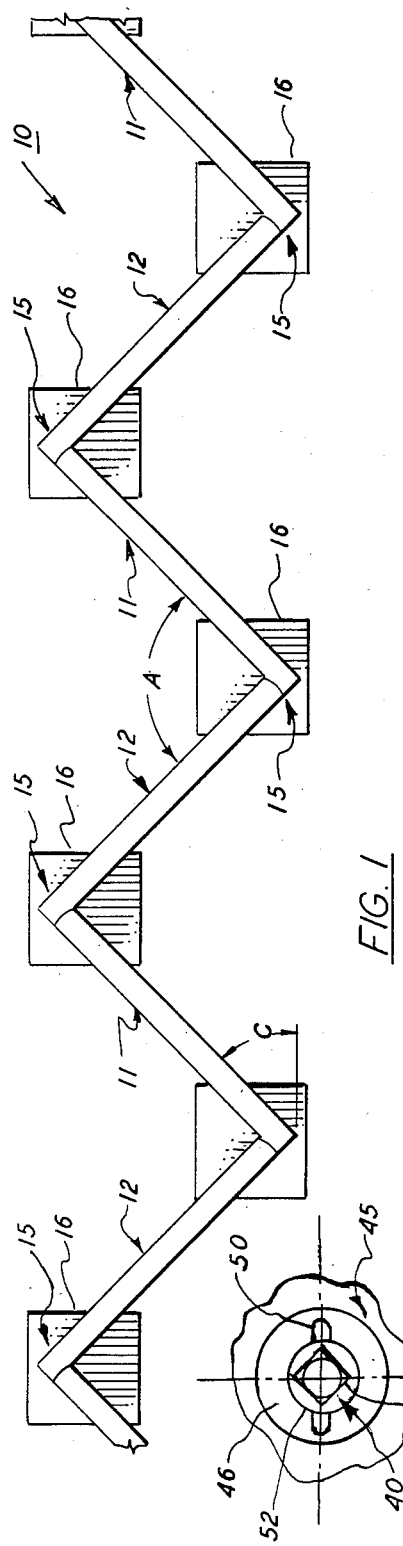
FIG. 1
FIG. 6
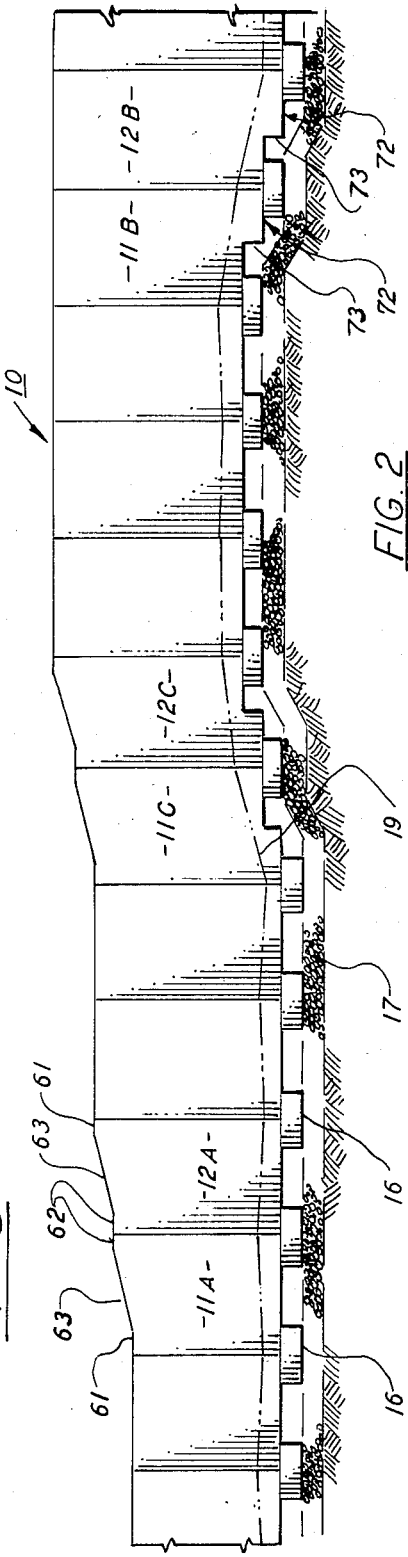
FIG. 2

NOISE BARRIER

BACKROUND OF THE INVENTION

This invention relates to an improved noise barrier and, in particular, to a serpentine noise barrier formed of abutting concrete panels.

Noise barriers of extended length are being placed along the sides of many major well travelled highways to provide a shield for reducing noise and help protect surrounding residences from other traffic related nuisances and hazards. The barriers also prevent pedestrians and stray animals from gaining access to the highway and also visually hide the roadway from view. A serpentine or zig-zag barrier formed of abutting vertically disposed panels furthermore provides a high strength, low cost self-standing structure that is relatively easy to erect and to maintain. The corners of the panels are typically set upon pads that are poured upon a granular fill and an earthen berm used to cover the base of the wall.

Securing the abutting panels together in assembly, however, has proven to be a difficult task for a number of reasons mostly relating to the nature of the joint used. Early barriers sometimes employed panels made in the form of a parallelogram wherein the end walls were each disposed at a predetermined angle. In assembly the flat end walls were abutted against the corner of an adjacent panel side wall and the two drawn together using bolts. The joint was thus formed of two flat abutting surfaces which did not allow for any angular adjustment during the erection of the barrier. Any misalignment due to topography or the placement of footings could not be accomodated by the joint and, as a consequence, the panels would rotate at the joint and make only localized contact at the corners. Drawing the bolts down tight would therefore overstress the panels in the localized contact regions and sometimes lead to failure.

A panel having hinged socket joints is disclosed in U.S. Pat. No. 3,732,652. The panel contains a rounded corner at one end wall that subtends an arc greater than 180°. The rounded surface of the corner passes into each of the side walls some distance to form a vertically disposed undercut in each side wall that extends the entire length of the panel. This undercutting of the panel forms a weak section at the corner that can be broken off during shipping and handling. Flat rotor discs are mounted in the corner in specially cast openings which are spaced along the length of the panel. The discs are rotatably secured to the panel by a vertical rod that is mounted in the corner in another cast or cored hole. These openings in the corner section further weaken the panel in this critical region. The rounded corner of one panel is received in a complimentary socket cast in the opposing wall of an adjacent panel. The rotor discs each contain a horizontally disposed stud that is slidably received in a clamping mechanism cast into the socket which, when clamped in place, permits the two panels to rotate at the joint. Here again the clamps are expensive to fabricate and difficult to cast into the panel. Furthermore, the rotor disc, being made of metal, is exposed to the elements and thus tends to corode weakening the barrier and discoloring the panels.

Another panel having a rounded socket joint similar to that noted above is disclosed in U.S. Pat. No. 4,111,401. In this arrangement, the rotor discs are replaced by cables that are passed through lateral openings formed in the panel so that the cables are able to wrap about the joint. The two ends of each cable must be securely anchored in the panels to secure the joint in assembly. The cable receiving holes again weaken the panels and the barrier. The cables are also exposed to the atmosphere and thus subject to corrosion. Wrapping and anchoring the cables in assembly is not only difficult but also time consuming thus increasing the time and cost required to erect the wall.

SUMMARY OF THE INVENTION

It is therefore an object of the present invention to improve serpentine noise barriers formed of abutting vertically disposed concrete panels.

It is a further object of the present invention to provide a concrete panel for a serpentine noise barrier that has a smooth outer surface yet provides a socket-like joint between adjacent panels that permits the panels to be angularly adjusted at the time of erection.

A still further object of the present invention is to provide a high strength panel joint for use in concrete noise barriers which permits the panels to be easily erected on site without special tools or handling equipment.

Another object of the present invention is to provide a noise barrier panel having socket-like joints that can be simply bolted in place at assembly.

These and other objects of the present invention are attained by means of a concrete noise barrier having a series of vertically disposed panels that are rotatably joined at the corners to form a serpentine wall. Each panel is rectangular shaped having a pair of parallel side walls and opposed end walls. One end wall is convex with its radius of curvature lying upon the horizontal axis of the panel. The other end wall is made up of two contiguous vertical wall surfaces that include a first planar wall surface that forms an obtuse angle with one of the side walls and a concave wall surface that intersects both the opposing panel side wall and the planar wall surface. The chord of the concave wall surface forms a right angle with the planar wall surface and has a length that is equal to the thickness of the panels.

Each successive panel in the barrier is a mirror image of the next adjacent panel whereby the concave wall surface on the first panel will intersect the front side wall of that panel while the concave wall surface on the second panel will be arranged to intersect the rear side wall of that panel. In assembly, the convex corner of the first panel is placed against the concave wall surface of the second panel to establish a socket-like joint that permits the two panels to be adjusted angularly. Bolts are passed laterally through the joint to draw the panels together at the time of erection. The bolt holes are specially prepared to allow the panels to rotate in the socket joint without the need of removing the bolts.

BRIEF DESCRIPTION OF THE DRAWINGS

For a better understanding of these and other objects of the present invention reference is had to the following detailed description of the invention which is to be read in conjunction with the accompanying drawings, wherein:

FIG. 1 is a top plan view of a concrete noise barrier embodying the teachings of the present invention;

FIG. 2 is a front elevation of a concrete noise barrier embodying the teachings of the present invention showing the serpentine wall panels placed at different elevations;

FIG. 6 is an enlarged end view of one of the bolts receiving holes used to close the joints between the panels making up the barrier.

DESCRIPTION OF THE INVENTION

With reference to the drawings, there is shown in FIG. 1, a top plan view of a noise barrier embodying the teachings of the present invention. The barrier, which is generally referenced 10, is formed of a series of vertically disposed concrete panels that are joined at the corners to establish a zig-zag or serpentine barrier suitable for placement along a roadway to shield the surrounding area from noise and other highway related nuisances and/or dangers. The panels depicted at 11 shall be arbitrarily referred to as right hand panels while those depicted at 12 shall be referred to as left hand panels. As illustrated, a right hand panel is always interposed between two left hand panels and vice versa along the length of the barrier. The corners or joints formed by each abutting pair of panels rests upon a square shaped footing or pad 16. The footings are poured of concrete upon specially prepared granular fill 17 (FIG. 2) whereby the footings are able to support the weight of the panels without moving.

As further illustrated in FIG. 2, the footings can be set at different elevations depending upon the topography. As will be explained in greater detail below, the panels can be angularly adjusted at the joints to compensate for any misalignment in the location of the pads or to slightly change the direction of the wall to avoid natural or artificial obstructions. The elevation of the wall can also be changed by altering the configuration of selected panels to overcome abrupt changes in topography or the like. A berm 19, shown in phantom outline in FIG. 2 is placed over the footings and the bottom section of the panels to help anchor the barrier and enclose the wall.

Figure 3:
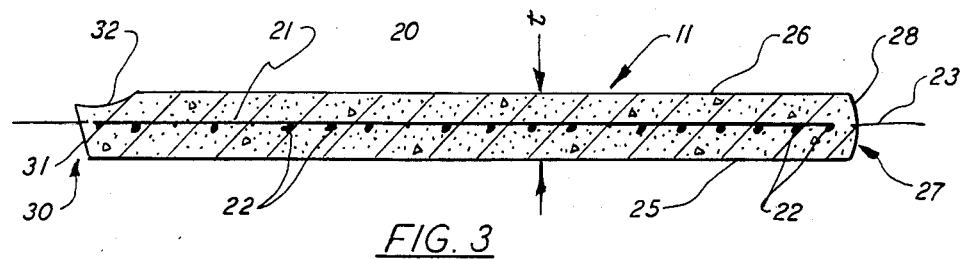
FIG. 3 is a top plan view of a right hand panel used to erect the present wall.
Figure 4:
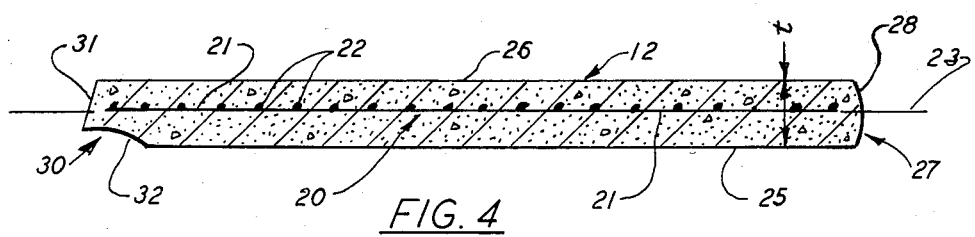
FIG. 4 is a top plan view of a left hand wall panel which is a mirror image of the panel shown in FIG. 3.

The size and shape of the individual panels can be changed to meet various design and load conditions. Typically, each panel will be between 4 feet and 15 feet high and 8 feet wide. The thickness of each panel will also generally be between 8 inches and 10 inches, again depending on load conditions. Each panel is further reinforced as shown in FIGS. 3 and 4 with a wire mesh 20 that conforms with ASTM standards. The mesh is made up of a series of horizontal wires 21 that are welded to or woven into a series of vertical wires 22 to form a mat that is centered on the horizontal axis 23 of the panel.

Figure 5:
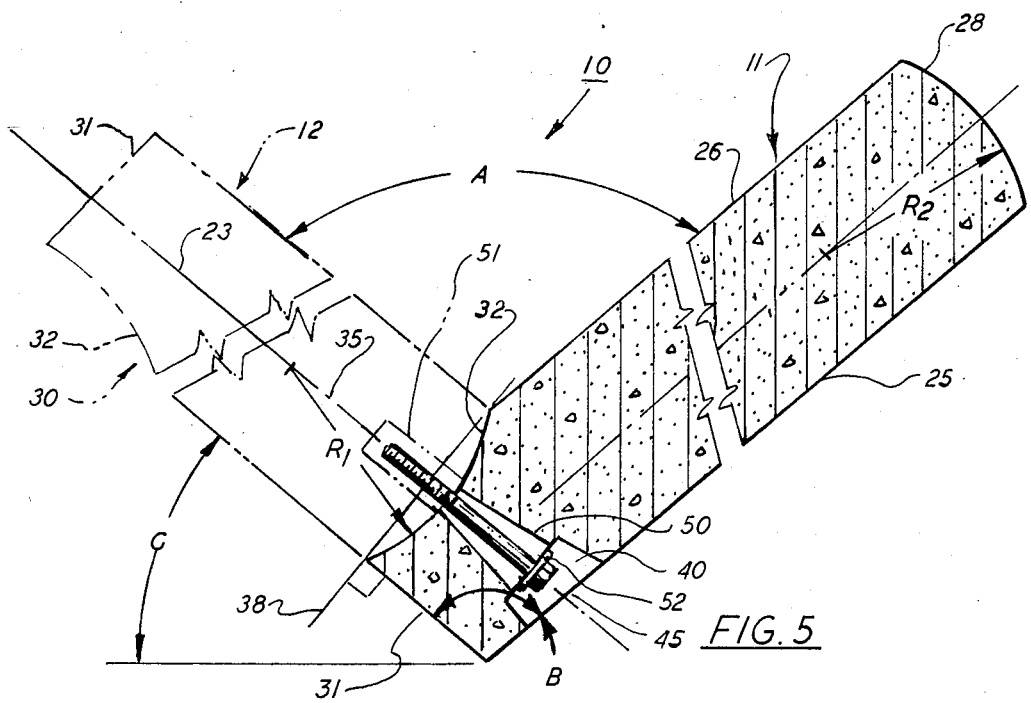
FIG. 5 is an enlarged top view in section showing the joint forced between abutting panels used in the present invention and bolts used to draw the panels together in assembly.

As further illustrated in FIGS. 3–5, each panel 11, 12 contains a front wall surface 25 that is parallel to the rear wall surface 26. The right side corner wall 27 of each panel has a convex surface 28 that extends along the length of the panel. The convex surface has a radius of curvature ($R_2$) which lies on the on the axis 23 inside the boundaries of the panel. The opposing corner end wall, generally referenced 30, is made up of two contiguous vertical wall surfaces that include a planar wall surface 31 and a concave wall surface 32. The planar wall surface forms an obtuse angle (a) with one of the side walls of the panel, with the angle being equal to the interior angle (b) formed by an abutting pair of panels as illustrated in FIG. 5. In the case of a right hand panel 11, the planar wall surface will intersect the front wall of the panel and in the case of a left hand panel 12 the plannar wall intersects the rear wall of the panel.

The concave wall surface 32 which forms part of corner 30 intersects both the contiguous planar wall 31 and the opposing side wall of the panel which again will be the rear wall 26 of panel 11 and the front wall 25 of panel 12, respectively. The convex wall surface of panel 12, as shown in FIG. 5, is adapted to be received within the concave opening in adjacent panel 11 to form a socket joint that permits the two panels to be angularly adjusted in assembly. The curved surfaces of the abutting panels form an extremely tight yet adjustable joint. The interior angle (a) formed by two adjacent panels can be altered a few degrees to either side of the normal or desired wall angle without impairing the integrity of the wall or the joint. In the embodiment shown, the interior angle (a) is set at about 110° while the exterior barrier angle (c) is about 40°. The radius of curvature ($R_1$) of concave wall surface 32 is equal to that ($R_2$) of convex wall surface 28. The chord 38 of the concave surface forms a right angle with wall surface 31 and has a length that is equal to the thickness (t) of the panels. The center of $R_2$ lies upon an axis 35 that parallels the planar wall surface 32 and is coaxially aligned with the axis of the abutting panel 12. Accordingly, when the joint is formed, the plane of wall 32 of panel 11 is brought into alignment with the front wall of an adjacent panel 12.

The joint between the panels is tightly closed by bolts so after the panels have been properly seated upon the footings and angularly adjusted to compensate for changes in topography and the like. Because of the unique construction of the joint, the bolts 40 are able to pass through the full thickness of one panel and be threaded into the second panel along the horizontal axis of the second panel. Accordingly each bolt is able to deliver maximum holding strength without weakening or otherwise degrading the panel structure.

Turning now to FIG. 5 and 6 the bolts are carried in specially prepared holes that permit the panels to be adjusted angularly to accomodate erection of the barrier without the need of removing the bolts from the hole. The holes 45 are counter sunk at the front wall entrance 46 to a depth sufficient to contain the head 47 of the bolt. The countersunk recess is joined by a tapered slot 50 that decreases in width toward the concave wall surface 32 of the panel. Both the countersink and the slot are centered upon the previously noted axis 35. The taper of the slot is about 10° to either side of the axis with the slot being generally aligned in a horizontal plane. A threaded adaptor 51 (FIG. 5) is cast into the convex corner wall of the abutting panel with the adaptor being aligned along the horizontal axis 23 of the panel. The adaptor is aligned, in assembly, with the bolt receiving hole so that the bolt can be accepted by the adaptor and is threaded down to draw the joint closed. An expanded washer 52 is placed under the bolt head to provide a secure seat for the bolt head at closure.

Referring once again to FIG. 2, the wall panels are further configured to alter the height of selected panels to adapt the wall to changing conditions. In one panel configuration exemplified by panels 11a and 12a, the height of the barrier wall is increased in stages at a location where the ground surface is relatively flat. As illustrated, the top wall surface is formed of two horizontal edge sections 61 and 62 that are cast at different elevations. The edge sections are joined by an inclined center section 63. The abutting corners of the panels thus meet at a flat upper edge which provides for both a strong joint and an aesthetically pleasing step in the wall.

As depicted by panels 11b and 12b, the bottom portions of the panels may also be stopped to accomodate rapid changes in ground elevation while holding the top surface of the wall level at a desired elevation. In this embodiment the bottom wall surface 72 is stopped at the midpoint of the panels by riser 73 to a height about equal to the height of the footings. Panels 11c and 12c show a combination wherein both the bottom walls of the panels are both stopped, and at the same time, the top of the panels are raised to a higher elevation as described in reference to panels 11a and 12a.

While this invention has been disclosed with specific reference to the detailed description set forth above it is not confined to this specific structure and this application is intended to cover any modifications and changes that may come within the scope of the following claims.

I claim:

1. In a noise barrier of the type having a series of vertically disposed concrete panels placed in end to end abutment to form a serpentine wall, said barrier including
   a rectangular panel having a pair of parallel side walls and a pair of opposed end walls
   a first end wall having a vertically disposed curved surface with the radius of curvature lying on the horizontal axis of the panel
   a second end having a pair of contiguous vertically disposed surfaces that includes a planar surface that intersects one side wall of the panel to form an obtuse angle therewith and a concave surface that intersects the other side wall of the panel
   said concave surface having a chord that forms a right angle with the planar surface and the length of chord being equal to the thickness of the panel whereby the radius of curvature of the concave surface lies on an axis that is parallel to the planar surface.

2. The noise barrier of claim 1 having a first series of panels interposed between a second series of panel wherein the concave surface on the panels in the first series intersects the front side wall of the panel and the concave surface on the panels in the second series intersects the rear side wall of the barrier whereby the convex end walls of each panel in the serpentine series is rotatably received in the concave surface of an adjacent panel to form an adjustable joint between adjacent panels.

3. The noise barrier of claim 2 wherein each joint contains a series of vertically spaced bolts passing laterally through the concave surface and being threaded into the convex wall of the other panel.

4. The noise barrier of claim 3 wherein the said one panel contains slotted holes that enter the panel through the side wall opposite the concave surface which permit the panel to be angularly adjusted at the joint without removing the bolts.

5. The noise barrier of claim 4 wherein said slotted holes are counter sunk at the entrance to recess the bolt heads within the panel.

6. The noise barrier of claim 4 wherein the axis of each slotted hole is parallel with the planar end wall surface.

7. The noise barrier of claim 2 having at least one panel having a top wall that includes a pair of horizontal surfaces disposed inwardly from each end wall of the panel, each horizontal surface being at a different elevation, and an inclined center surface connecting the two edge surfaces whereby the elevation of the barrier can be changed.

8. The noise barrier of claim 2 wherein at least one panel contains a vertical riser in the bottom wall thereof with the vertical riser of the step being along the midline of the panel.

* * * * *